(12) United States Patent
Davis

(10) Patent No.: US 9,797,521 B1
(45) Date of Patent: Oct. 24, 2017

(54) ROTARY MAGNETIC COUPLING ACTUATED VALVE WITH EXTERNAL MAGNETS AND INTERNAL MAGNETIC FLUX PATH

(71) Applicant: Edward P Davis, Kihei, HI (US)

(72) Inventor: Edward P Davis, Kihei, HI (US)

(*) Notice: Subject to any disclaimer, the term of this patent is extended or adjusted under 35 U.S.C. 154(b) by 0 days.

(21) Appl. No.: 15/400,806

(22) Filed: Jan. 6, 2017

Related U.S. Application Data

(60) Provisional application No. 62/372,613, filed on Aug. 9, 2016.

(51) Int. Cl.
| | |
|---|---|
| *F16K 31/08* | (2006.01) |
| *F16K 1/22* | (2006.01) |
| *F16K 3/02* | (2006.01) |
| *F16K 5/06* | (2006.01) |
| *F16K 31/06* | (2006.01) |

(52) U.S. Cl.
CPC ............ *F16K 31/082* (2013.01); *F16K 1/22* (2013.01); *F16K 3/0281* (2013.01); *F16K 5/0647* (2013.01); *F16K 31/06* (2013.01)

(58) Field of Classification Search
CPC .... F16K 31/086; F16K 31/088; F16K 31/082; F16K 31/06
USPC .......................................................... 251/65
See application file for complete search history.

(56) References Cited

U.S. PATENT DOCUMENTS

| | | | | |
|---|---|---|---|---|
| 2,289,574 A | * | 7/1942 | Carlson | F16K 31/088 251/65 |
| 2,346,904 A | * | 4/1944 | Carlson | F16K 31/088 251/65 |
| 3,105,147 A | * | 9/1963 | Weilbach | G01N 21/37 250/252.1 |
| 3,347,262 A | | 10/1967 | Gibson | |
| 3,747,892 A | | 7/1973 | Gigantino et al. | |
| 4,284,262 A | * | 8/1981 | Ruyak | F16K 31/088 251/129.03 |
| 4,327,892 A | * | 5/1982 | Ruyak | F16K 31/088 251/129.03 |
| 4,382,578 A | | 5/1983 | Ruyak | |
| 4,384,703 A | * | 5/1983 | Ruyak | F16K 31/088 137/556.6 |
| 4,671,486 A | * | 6/1987 | Giannini | F16K 31/088 251/267 |
| 4,792,113 A | | 12/1988 | Eidsmore | |

(Continued)

*Primary Examiner* — Umashankar Venkatesan
(74) *Attorney, Agent, or Firm* — K&L Gates LLP

(57) ABSTRACT

Various devices and techniques related to magnetically-actuated valves are generally described. In some examples, valves may include a valve body with a cavity. Valves may include a stem at least partially disposed in the cavity. Valves may include a valve member coupled to the stem. Valves may include a ferromagnetic actuation member disposed in the cavity. The ferromagnetic actuation member may be operatively coupled to the stem such that movement of the ferromagnetic actuation member actuates movement of the valve member between an open position and the closed position. Valves may include an actuator exterior to the valve body. The actuator may include a first magnetic pole section and a second magnetic pole section. A magnetic flux may flow from the first magnetic pole section through the ferromagnetic actuation member to the second magnetic pole section in a magnetic flux path through the interior portion of the valves.

22 Claims, 15 Drawing Sheets

(56) References Cited

U.S. PATENT DOCUMENTS

| | | | |
|---|---|---|---|
| 5,009,388 | A | 4/1991 | Pei-gi et al. |
| 5,029,061 | A | 7/1991 | Shek |
| 5,345,968 | A | 9/1994 | Day |
| 5,582,206 | A | 12/1996 | Brillant |
| 5,611,368 | A * | 3/1997 | Hwang .................... F16J 15/50 137/553 |
| 5,785,296 | A * | 7/1998 | Peube ..................... F02D 11/10 251/129.11 |
| 6,161,722 | A | 12/2000 | Sooudi et al. |
| 6,325,354 | B1 | 12/2001 | Hoen et al. |
| 7,007,915 | B2 * | 3/2006 | Vincent .................. F16K 31/42 251/209 |
| 7,363,942 | B2 | 4/2008 | Fernandez |
| 9,377,121 | B2 | 6/2016 | Burgess et al. |
| 2005/0126637 | A1 | 6/2005 | Lee et al. |
| 2008/0073606 | A1 | 3/2008 | Liantonio |
| 2010/0294968 | A1 * | 11/2010 | Teague, Jr. ............ F16K 31/607 251/304 |
| 2012/0097873 | A1 | 4/2012 | Decker et al. |

\* cited by examiner

FIG. 2A
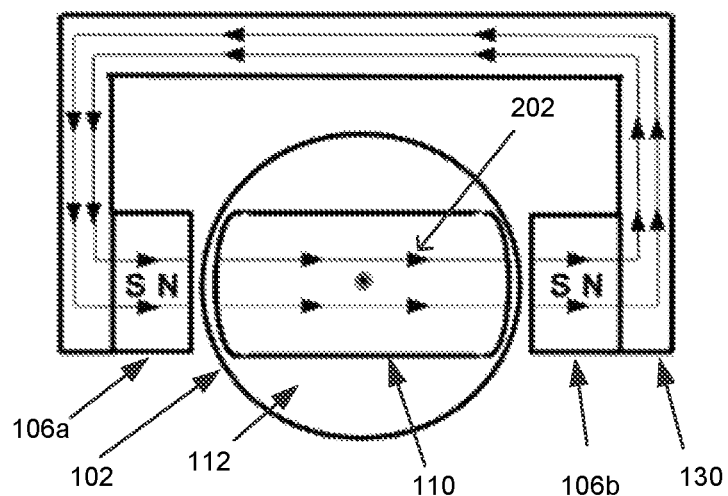
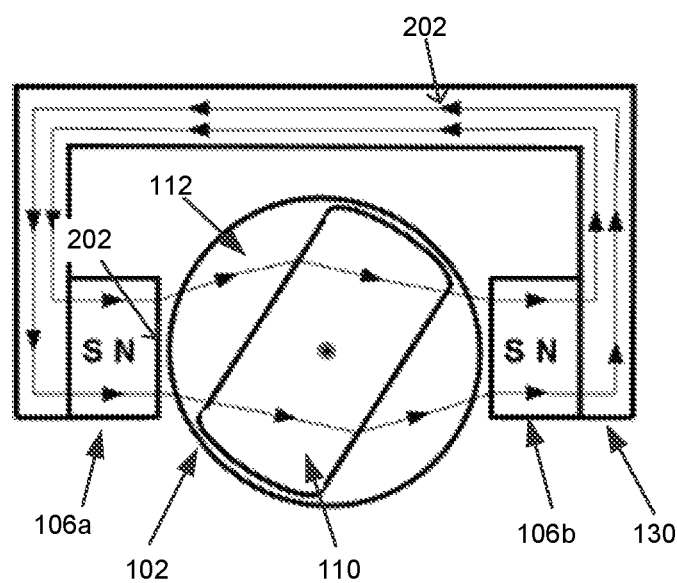
FIG. 2B

FIG. 4A
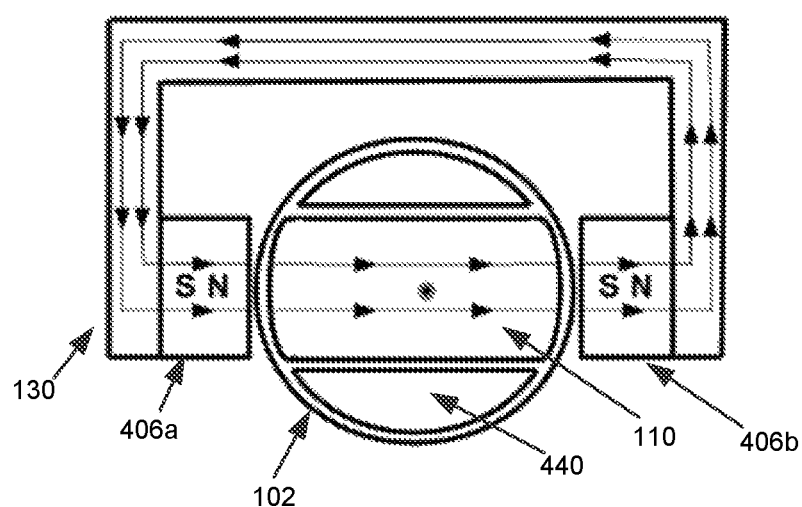
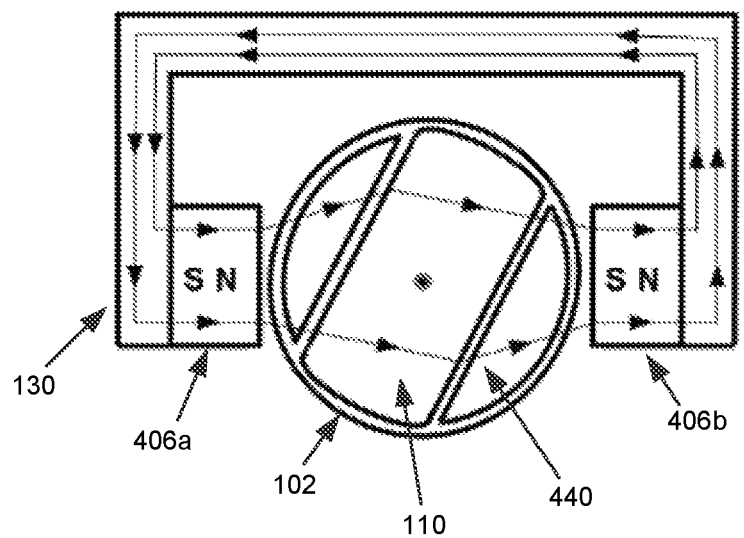
FIG. 4B

FIG. 13A
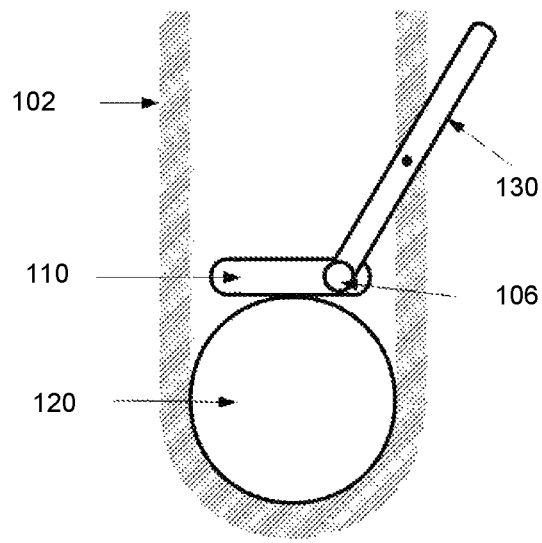
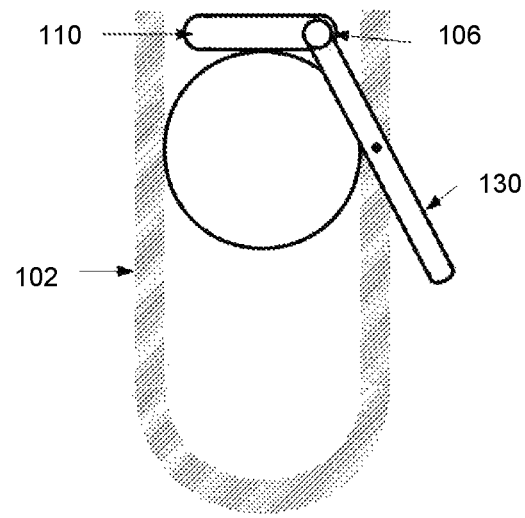
FIG. 13B

FIG. 14A
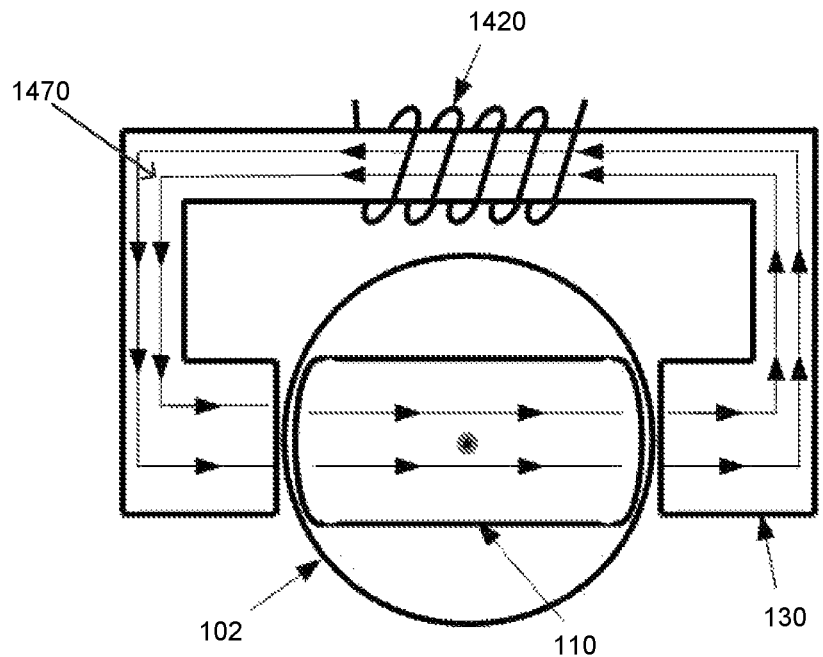
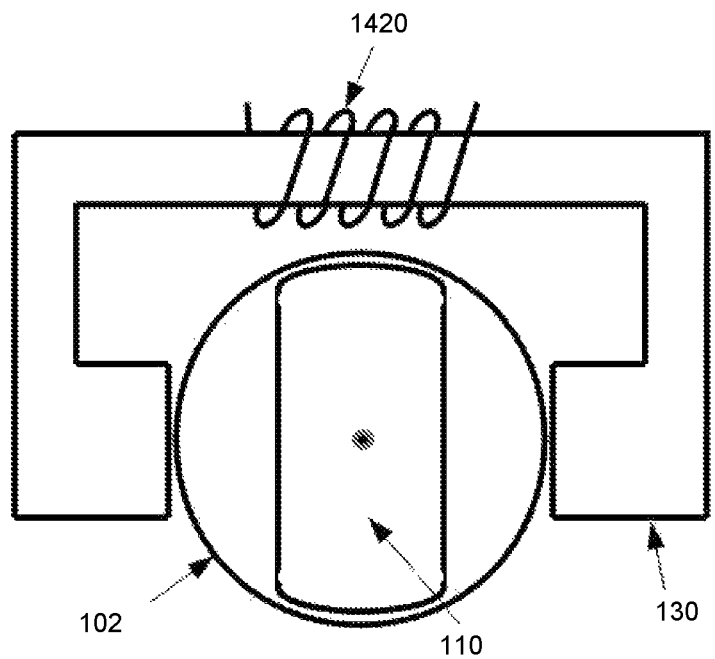
FIG. 14B

ROTARY MAGNETIC COUPLING ACTUATED VALVE WITH EXTERNAL MAGNETS AND INTERNAL MAGNETIC FLUX PATH

CROSS-REFERENCE TO RELATED APPLICATIONS

This application claims the benefit of U.S. Provisional Application No. 62/372,613 filed Aug. 9, 2016, the disclosure of which is incorporated herein by reference in its entirety.

FIELD

This application relates to valve technology and, more specifically, to valve actuator mechanisms.

BACKGROUND

Valves often develop leaks as they age. Leaking valves can be annoying, wasteful, and can cause damage in residential settings, but can be far more problematic in industrial applications. Factory lines may need to be shutdown to repack or replace valves resulting in lost production and unnecessary downtime. Leaks can cause environmental damage and safety issues. Steam leaks can scald and even kill workers. The Environmental Protection Agency (EPA) is concerned about pollution resulting from leaky valve stem seals in factories and oil fields. In extreme cases, such as semiconductor manufacturing, even microscopic leaks can be fatal—breathing tanks and hazmat suits are often required to clean up after leaks are detected in semiconductor foundries.

Most traditional valves usually have two moving seals: (1) the Seat where the flow of material through the valve is allowed, controlled, and shut off, and (2) the Stem seal that keeps the material from leaking out of the hole for the valve handle. Studies have shown that some high percentage of the leaks encountered in real world valves are associated with the stem seals because they tend to entrain dirt and grit which can erode the mating surfaces over time.

Traditional valves contain stem seals that often degrade or leak over time. Previous seal-less valves often employed bending or flexing components such as bellows or membranes that can degrade or fatigue and also leak long term. Additionally, previous generations of magnetic valves usually contained internal magnets and/or operated in a linear solenoid type manner making high temperature operation difficult to achieve, and often requiring continuous power to maintain their position.

SUMMARY

Systems and methods are provided for magnet-actuated valves with external magnets and internal magnetic flux paths.

In accordance with various embodiments of the present invention, a valve assembly is generally described. In some examples, the valve assembly may comprise a valve body defining an enclosure. In some other examples, the valve assembly may further comprise a stem disposed in the enclosure. In various other examples, the valve assembly may further comprise a movable valve member disposed in the enclosure and operatively coupled to a first end of the stem. In some examples, the valve assembly may further comprise an internal actuation member having a ferromagnetic portion. In various examples, the internal actuation member may be operatively coupled to a second end of the stem. In some other examples, the valve assembly may further comprise an external actuator operatively coupled to an exterior of the valve body. In some examples, the external actuator may comprise a first magnetic pole section adjacent to the valve body. In some other examples, the external actuator may comprise a second magnetic pole section adjacent to the valve body. In some examples, when the external actuator is in a first rotational position relative to the internal actuation member there may be a first magnetic reluctance between the first magnetic pole section and the second magnetic pole section. In some further examples, when the external actuator is in a second rotational position relative to the internal actuation member, there may be a second magnetic reluctance between the first magnetic pole section and the second magnetic pole section. In various examples, the second magnetic reluctance may be lower than the first magnetic reluctance. Accordingly, in some further examples, when the external actuator is in the second rotational position, a magnetic flux path from the first pole, through the ferromagnetic portion, to the second pole may have a magnetic field strength sufficient to cause rotation of the stem when the external actuator is rotated.

In accordance with various other embodiments of the invention, valves are generally described. In various examples, the valves may comprise a valve body having an interior portion and an exterior portion. In some examples, the interior portion may define a cavity. In some further examples, the valves may further comprise a stem at least partially disposed in the cavity. In some other examples, the valves may further include a movable valve member coupled to the stem and movable between an open position and a closed position. In yet other examples, the valves may further include an internal actuation member having a ferromagnetic portion comprising an impermanent magnet disposed in the cavity. In some examples, the internal actuation member may be operatively coupled to the stem such that movement of the internal actuation member actuates movement of the movable valve member between the open position and the closed position. In some further examples, the valves may further comprise an external actuator coupled to the exterior portion of the valve body. In some examples, the external actuator may comprise a first magnetic pole section adjacent to the exterior portion of the valve body. In still further examples, the external actuator may also include a second magnetic pole section adjacent to the exterior portion of the valve body. In various examples, a magnetic flux may flows from the first magnetic pole section through the ferromagnetic portion to the second magnetic pole section in a magnetic flux path through the interior portion of the valve. In some examples, the magnetic flux may have a magnitude sufficient to cause movement of the internal actuation member in response to movement of the external actuator.

In some further examples, methods for magnetically actuating a valve are generally described. In various examples, the methods may include providing a valve comprising a sealed valve body, a stem disposed at least partially within the sealed valve body, a valve member coupled to a first end of the stem, and an internal actuation member disposed within the sealed valve body. In some examples, the internal actuation member may be coupled to a second end of the stem. In various examples, the methods may further include coupling an external actuator to an exterior region of the sealed valve body. In some examples, the external actuator may comprise a first magnetic pole section adjacent to the sealed valve body and a second magnetic pole section adjacent to the sealed valve body. In some further examples, the methods may further include magnetizing at least a portion of the internal actuation member by exposing the internal actuation member to magnetic fields of the first magnetic pole section and the second magnetic pole section to create a magnetic flux flowing from the first magnetic pole section, through the internal actuation member, and to the second magnetic pole section. In some examples, when the external actuator is in a first rotational position relative to the internal actuation member there may be a first magnetic reluctance between the first magnetic pole section and the second magnetic pole section. In some other examples, when the external actuator is in a second rotational position relative to the internal actuation member there may be a second magnetic reluctance between the first magnetic pole section and the second magnetic pole section. In various examples, the second magnetic reluctance may be lower than the first magnetic reluctance. In some other examples, the methods may further include rotating the external actuator. In some examples, the rotation of the external actuator may cause a corresponding rotation of the internal actuation member due to the magnetic flux. In various further examples, the methods may further include moving the valve member between an open position and a closed position.

Still other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention. Accordingly, the drawings and detailed description are to be regarded as illustrative in nature and not as restrictive.

BRIEF DESCRIPTION OF DRAWINGS

FIGS. 2A and 2B depict a magnetic flux path through a magnet-actuated valve including two external magnets, in accordance with various aspects of the present disclosure;

FIGS. 4A and 4B depict a magnetic flux path through a magnet-actuated valve including a magnetically inert material enclosed within the body of the valve and utilizing two external magnets, in accordance with various aspects of the present disclosure;

FIGS. 13A and 13B depict a lever-operated gate valve of a magnet-actuated valve, in accordance with various aspects of the present disclosure;

FIGS. 14A and 14B depict a magnetic flux path through a magnet-actuated valve including an external electromagnet, in accordance with various aspects of the present disclosure;

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved systems and methods for actuating valves using an external magnet and internal magnetic flux path. These embodiments may provide improved durability and leak-resistance, as well as overcoming various technical challenges presented when using conventional magnetic valves.

Figure 1:
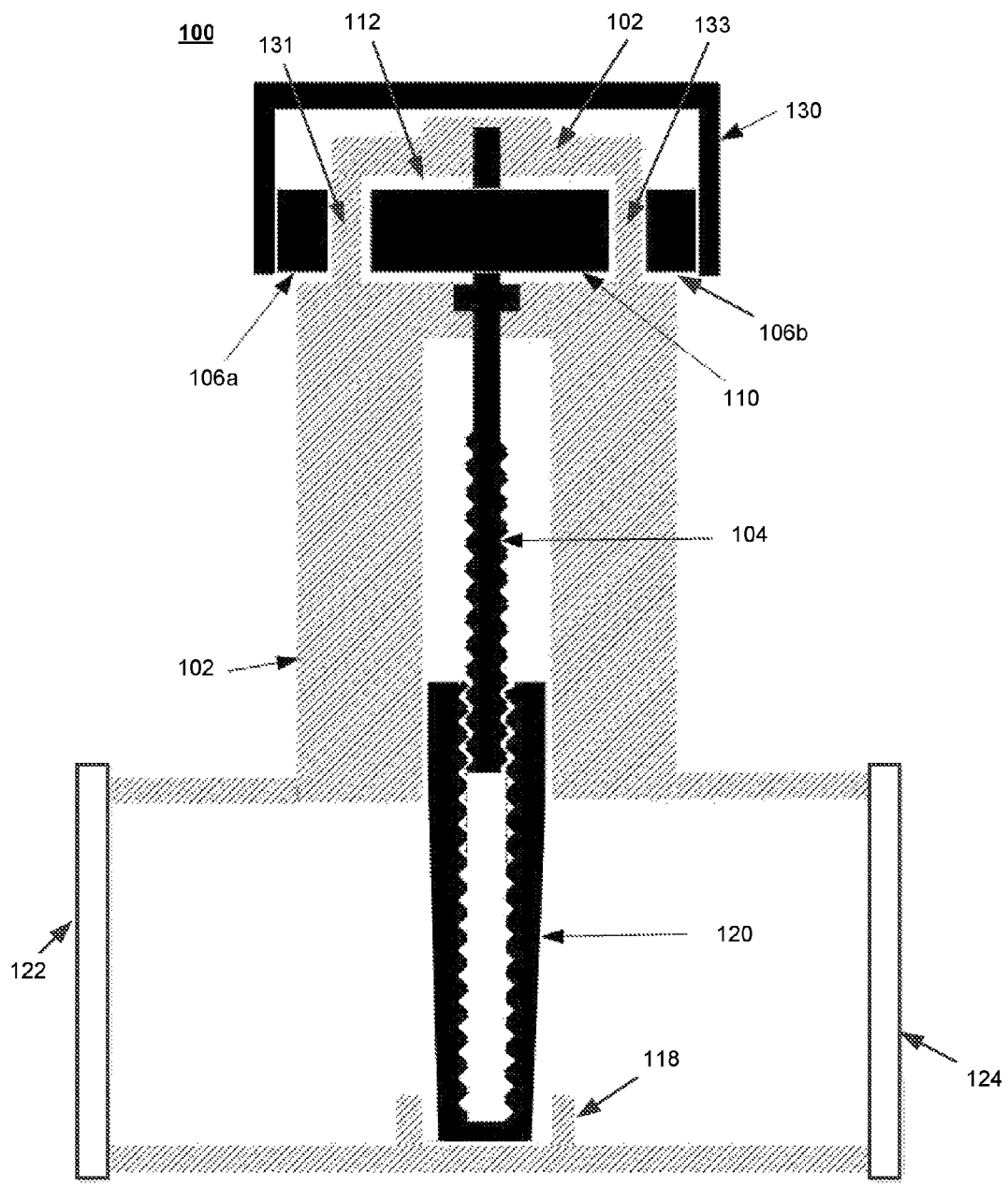
FIG. 1 depicts a cross-sectional side view of a magnet-actuated valve, in accordance with some aspects of the present disclosure.

FIG. 1 depicts a cross-sectional side view of a magnet-actuated valve assembly 100, in accordance with various aspects of the present disclosure. Valve assembly 100 includes a body 102. Body 102 may be the outer casing of valve assembly 100 and may comprise any desired material depending on the desired application for the particular valve assembly 100. In various examples, body 102 may comprise various metallic materials such as brass, copper, steel, bronze, gunmetal, alloy steels, non-400 series stainless steels, iron or the like. In some examples, body 102, or portions of body 102, may comprise a metal that has a low magnetic permeability. In some examples, portions of body 102 (e.g., the portion of body 102 in FIG. 1 depicted above and/or surrounding cavity 112) may comprise a material with a low magnetic permeability in order to avoid shunting magnetic flux through the body of the valve, thereby weakening the magnetic actuation mechanism described herein. In some examples, the portion of body 102 adjacent to cavity 112 may comprise a metal that has a low magnetic permeability. For example, the metal may comprise aluminum, copper, titanium, and alloys thereof, and may exhibit a relative magnetic permeability (e.g., the ratio of magnetic permeability of a material vs. the magnetic permeability of free space) less than 10. In some embodiments the metal may exhibit a relative magnetic permeability of about 1. In still other examples, body 102 may comprise one or more plastics and/or composite materials. Different materials may be selected for body 102 depending on the desired application for the valve assembly 100. For example, materials may be selected for body 102 of valve 100 which are resistant to corrosion, heat, moisture, rust, and/or bacterial growth.

Figure 9:
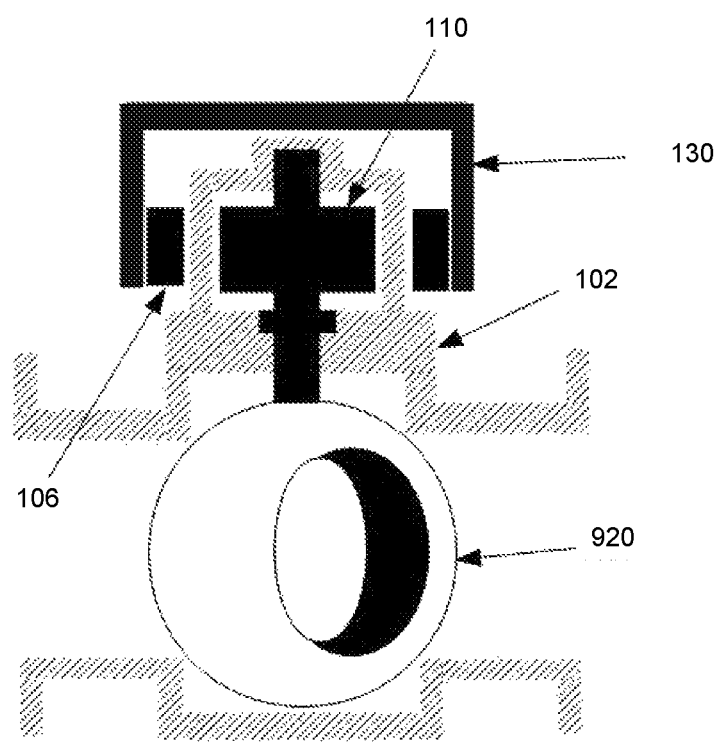
FIG. 9 depicts a cross-sectional side view of a magnet-actuated ball valve, in accordance with some aspects of the present disclosure.

Valve assembly 100 may include a stem 104. Stem 104 may transmit motion from a handle, actuator, and/or other controlling device to a movable valve member 120. For example, in a ball valve (e.g., a valve in which valve member 120 is a ball, as depicted in FIG. 9), stem 104 may be operatively coupled to the ball such that rotating the stem 104 using a handle or other actuator of the valve may, in turn, rotate the ball between an open position and a closed position to control a flow of fluid through the valve. Various types of valves along with their corresponding actuation mechanisms and valve members (sometimes referred to as "discs") may be used in accordance with embodiments of the present disclosure. In a few examples, gate valves, ball valves, globe valves, butterfly valves, plug valves, poppet valves, needle valves, and/or spool valves may be used in accordance with embodiments of the present disclosure depending on the desired valve type.

Body 102 of valve assembly 100 may be formed in such a way as to define an enclosure such as cavity 112 depicted in FIG. 1. In some examples, cavity 112 may be formed from a portion of body 102 with a smaller diameter and/or cross-sectional width relative to other portions of valve body 102. Additionally, in some examples, portions of body 102 defining cavity 112 may be relatively thin so as to transmit magnetic flux from external magnets 106 into cavity 112. For example, portion 131 and portion 133 may be of a thickness such that magnetic flux passes from external magnet 106a, through internal actuation member 110, and to external magnet 106b. Although portions 131 and 133 of body 102 are described as being separate portions of body 102, it should be appreciated that body 102 may be a continuous material enclosing and sealing internal actuation member 110 within cavity 112. In valve assembly 100, stem 104 may be entirely contained within the body 102 of the valve assembly 100 such that no portion of the stem 104 extends outside of body 102.

In some examples, cavity 112 may be cylindrical. In various further examples, external actuator 130 may comprise an annular base portion concentric with the cylindrical cavity 112. External magnets 106a, 106b may be disposed on a first portion of the annular base portion of external actuator 130. A first magnetic pole section (the south pole of external magnet 106a, in FIG. 2A) of external magnet 106a may be disposed adjacent to a first location of the annular base portion of external actuator 130. Similarly, a second magnetic pole section (the north pole of external magnet 106b, in FIG. 2A) of external magnet 106b may be disposed adjacent to a second location of the annular base portion of external actuator 130.

Internal actuation member 110 may be mechanically coupled to stem 104. Accordingly, rotation of internal actuation member 110 may rotate stem 104, which may, in turn, actuate movement of valve member 120 between an open position and a closed position in seat 118. As depicted in FIG. 1, internal actuation member 110 may be enclosed within cavity 112 such that internal actuation member 110 is not exposed to the exterior of body 102 of valve 100. Internal actuation member 110 may comprise a material having a high magnetic permeability such that magnetic flux flows from an external magnet (such as, for example, external magnets 106a, 106b) through internal actuation member 110 and returns to either the same external magnet or a different external magnet. In some examples, internal actuation member 110 may comprise one or more ferromagnetic materials such as iron, nickel, cobalt and/or alloys thereof. In another example, internal actuation member 110 may comprise 400 series stainless steel. Although internal actuation member 110 may comprise one or more materials having high magnetic permeability, in various examples, ferromagnetic actuation member may not be a permanent magnet and may not necessarily include permanent magnets. Internal actuation member 110 and/or materials of internal actuation member 110 may be temporarily magnetized while internal actuation member 110 is exposed to magnetic fields of magnetic pole sections of external magnets 106a, 106b.

In some examples, internal actuation member 110 may be non-radially symmetric. For example, internal actuation member 110 may comprise an elongate member with a first end aligned with a first magnetic pole section of external magnet 106a and a second end aligned with a second magnetic pole section of magnet 106b, in a preferred orientation. Additionally, in some examples, internal actuation member 110 may comprise a material of high magnetic permeability, such as iron or 400 series stainless steel, embedded within a material of low magnetic permeability, such as ceramic. In some examples, the embedded material may form a path within the ceramic material such that magnetic flux flows along the path when a magnetic field interacts with internal actuation member 110.

In some examples, external actuator 130 may comprise a handle, lever, or other actuation mechanism effective to rotate external magnets 106a, 106b around body 102. In various examples, motors may be used to turn the handle and/or control actuation of external actuator 130. Generally, when the handle is not being turned or otherwise actuated, the internal actuation member 110 maintains its current position and thus the valve member 120 remains in its current state. Although external actuator 130 is depicted in FIG. 1 as being above the valve body 102, in some examples, external actuator 130 may be in-plane with magnets 106a, 106b or underneath magnets 106a, 106b. In some examples, external actuator 130 may comprise a ferromagnetic material to form a return flow path for magnetic flux flowing from external magnet 106a, through internal actuation member 110, to magnet 106b, and through ferromagnetic external actuator 130 to return to external magnet 106a. It should be appreciated that in various other examples, magnetic flux may flow from external magnet 106b, through internal actuation member 110, to magnet 106a, and through ferromagnetic external actuator 130 to return to external magnet 106b.

Magnetic flux from external magnets 106a, 106b may be effective to orient internal actuation member 110 in a preferred orientation with respect to the magnetic pole sections of external magnets 106a, 106b.

In still other examples described in further detail below, external magnet 106a may include a north pole section and south pole section. In such an example, magnetic flux may flow from the north pole section of external magnet 106a, through a flux path in internal actuation member 110, and return from internal actuation member 110 to the south pole section of external magnet 106a. Similarly, in another example, external magnet 106b may include a north pole section and south pole section. In such an example, magnetic flux may flow from the north pole section of external magnet 106b, through a flux path in internal actuation member 110, and return from internal actuation member 110 to the south pole section of external magnet 106b.

External magnets 106a and 106b may comprise, for example, permanent magnets such as Neodymium Iron Boron magnets, Samarium Cobalt magnets, Alnico magnets, Ceramic and/or Ferrite magnets. Examples of different Neodymium magnets may include N42, N52, and N42SH grade Neodymium magnets. Different magnets may exhibit different magnetic field strengths (in terms of Gauss and/or Teslas) and different pull forces. As such, different magnets may produce different amounts of torque in internal actuation member 110 when the magnets are rotated around the exterior of cavity 112. In some examples, external magnets 106a and/or 106b may comprise combinations of different permanent magnets. Additionally, in some examples, external magnets 106a and/or 106b may comprise electromagnets.

External magnets 106a and/or 106b may exhibit different Curie temperatures depending on the particular types of magnets used. A Curie temperature is the temperature at or above which a magnet becomes demagnetized. After the temperature of a magnet drops below the Curie temperature, the magnet may no longer behave as it did prior to reaching the Curie temperature, or temperatures above the Curie temperature. In the examples described in the present disclosure, magnets are included in the external portions of the various valves, but may not be included within body 102 or cavity 112. Such a configuration may be advantageous if the valves are welded, soldered, and/or brazed during installation and/or repair. If the valves are to be subjected to temperatures above the Curie temperature for the particular external magnets, the external magnets may be removed prior to heating the valve in order to avoid demagnetizing the external magnets. The external magnets may thereafter be reattached after the valve has returned to the rated operating temperature range for the particular external magnets used with the valve. The valve may thereafter be actuated using the various techniques described in the present disclosure. In some examples, body 102 of valve assembly 100 and/or the external magnets 106a, 106b may be heat-shielded using insulating materials to prevent hot material passing through the valves (e.g., steam or other hot liquids) from demagnetizing the external magnets 106a, 106b. In some other examples, valves in accordance with the present disclosure may include one or more heat sinks (such as radiators and/or fins) to dissipate heat caused by hot material passing through the valves in order to prevent demagnetization of external magnets 106a, 106b.

Because internal actuation member 110 is not a permanent magnet, internal actuation member 110 may be heated without losing its ferromagnetic properties. Additionally, by sealing stem 104 within body 102 of valve assembly 100, a stem seal is avoided. A stem seal is an interface through which a stem passes between the interior of a valve and the exterior of the valve. Dirt and/or other contaminants can be introduced at the stem seal and can cause a leak in the stem seal. As such, for many applications it may be advantageous to seal the stem within the body of the valve assembly 100, as described herein.

Valve 100 may include ports 122 and 124. Although in the example depicted in FIG. 1, two ports are shown, more ports may be used depending on the particular valve. Ports 122 and 124 may be inlet and/or outlet ports. Additionally, in some examples, ports 122 and 124 may be interchangeable as inlet ports and outlet ports depending on the way valve 100 is installed in a system.

FIGS. 2A and 2B depict a magnetic flux path through a magnet-actuated valve including two external magnets, in accordance with various aspects of the present disclosure. In FIG. 2A, magnetic flux is depicted using magnetic flux lines 202 with arrows showing the direction of flow in the magnetic flux path. In FIG. 2A, internal actuation member 110 has an elongate, rectangular bar shape with a longer length and a shorter width. As depicted in FIG. 2A, internal actuation member 110 is aligned along its length with magnets 106a and 106b.

Magnetic flux may flow from the north pole section of external magnet 106a. Magnetic flux may flow into body 102, through internal actuation member 110, out of body 102, and into the south pole section of external magnet 106b. External actuator 130 may comprise a ferromagnetic material and the magnetic flux may flow through external actuator 130 to return to the south pole section of external magnet 106a.

In FIG. 2B external actuator 130 has been rotated such that external magnets 106a and 106b have become misaligned with respect to rod-shaped internal actuation member 110. External magnets 106a and 106b create a magnetic flux path through internal actuation member 110 resulting in a restoring torque causing internal actuation member 110 to rotate to align with magnets 106a and 106b, as depicted in FIG. 2A. Accordingly, rotating external actuator 130 causes a change in direction of the magnetic flux path. Internal actuation member 110 experiences a restoring torque causing internal actuation member 110 to rotate inside cavity 112 to stay in alignment with the magnetic flux path created by external magnets 106a and 106b. Alignment of internal actuation member 110 with respect to external magnets 106a, 106b and the magnetic flux path results in the lowest magnetic reluctance vis-à-vis misaligned orientations of the internal actuation member 110 with respect to external magnets 106a, 106b. For example, when external actuator 130 is in the rotational position relative to internal actuation member 110 depicted in FIG. 2B, there may be a relatively high magnetic reluctance experienced by internal actuation member 110. When external actuator 130 is in the rotational position relative to internal actuation member 110 depicted in FIG. 2A, there may be relatively low magnetic reluctance experienced by internal actuation member 110. When the external actuator 130 is in the rotational position with respect to internal actuation member 110 that is depicted in FIG. 2A, a magnetic flux path from the north pole of external magnet 106a, through the ferromagnetic portion of internal actuation member 110, to the south pole of external magnet 106b may have a magnetic field strength sufficient to cause rotation of the stem when the external actuator 130 is rotated.

As described above, rotation of external actuator 130 (and thus external magnets 106a, 106b) may cause corresponding rotation of internal actuation member 110. Rotation of internal actuation member 110 may actuate stem 104 (depicted in FIG. 1) which may, in turn, actuate movement of valve member 120 (depicted in FIG. 1) between the open and closed position or between the closed and open position, depending on the direction of rotation of internal actuation member 110.

In the embodiment depicted in FIGS. 2A and 2B, the width of internal actuation member 110 corresponds to the width of external magnets 106a and 106b. Matching and/or approximating the dimensions of those portions of internal actuation member 110 that are disposed at the interface with the external magnets when the internal actuation member 110 is in its lowest reluctance, aligned state, may increase the torque produced when external actuator 130 is rotated.

Figure 3A:
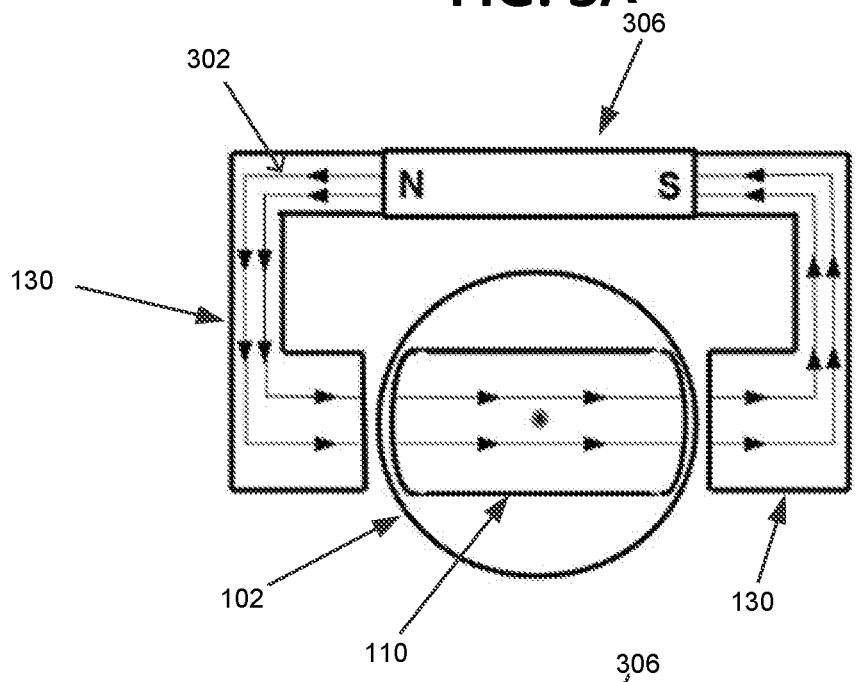
FIGS. 3A and 3B depict a magnetic flux path through a magnet-actuated valve including one external magnet, in accordance with various aspects of the present disclosure.
Figure 3B:
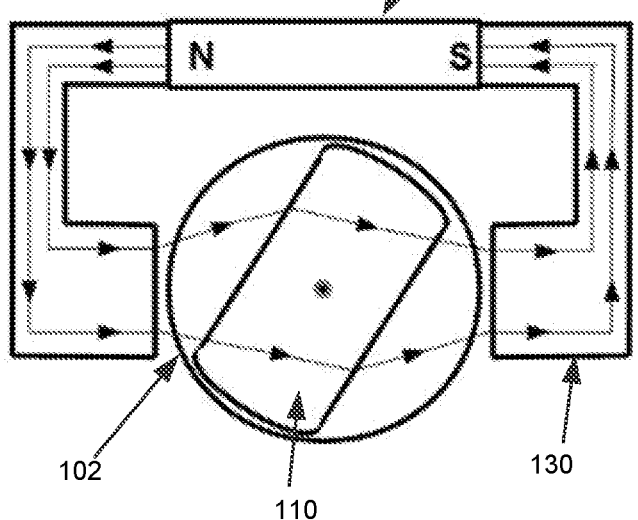

FIGS. 3A and 3B depict a magnetic flux path through a magnet-actuated valve including an external magnet 306, in accordance with various aspects of the present disclosure. In FIG. 3A, magnetic flux is depicted using magnetic flux lines 302 with arrows showing the direction of flow in the magnetic flux path. In FIG. 3A, external actuator 130 includes a single magnet 306 with a north pole section and a south pole section. In the single magnet example depicted in FIGS. 3A and 3B, the external actuator 130 may comprise a ferromagnetic material so that the magnetic flux flows from the north pole section of magnet 306, through external actuator 130, through internal actuation member 110, and through external actuator 130 to return to the south pole section of magnet 306. Although a single magnet 306 is depicted, in various examples, multiple magnets may be included in external actuator 130 in the same orientation as magnet 306 to intensify the strength of the magnetic field and, in turn, increase the restorative torque generated when internal actuation member 110 becomes misaligned from external actuator 130 (as shown in FIG. 3B).

FIGS. 4A and 4B depict a magnetic flux path through body 102 of a magnet-actuated valve utilizing two external magnets 406a and 406b and including a magnetically inert material 440 enclosed within the body 102 of the valve, in accordance with various aspects of the present disclosure. The example depicted in FIGS. 4A and 4B is similar to the example depicted in FIGS. 2A and 2B except that in FIGS. 4A and 4B, internal actuation member 110 may comprise ferromagnetic material embedded within magnetically inert material 440. Additionally, although two magnets are depicted in FIGS. 4A and 4B, a different number of magnets may be used in accordance with the various techniques and embodiments described herein. Examples of magnetically inert material 440 may include ceramic, plastics, composites, non-400 series stainless steel, molding material, rubber, etc. In the examples depicted in FIGS. 4A and 4B, although internal actuation member 110 is depicted as a rectangular bar, internal actuation member 110 may instead by separated into a number of different portions embedded within magnetically inert material 440. For example, a number of iron strips, rods, spheres, tabs, and/or other shapes of ferromagnetic materials may be embedded within magnetically inert material 440 to create a magnetic flux path through internal actuation member 110 inside body 102. The various embedded ferromagnetic materials may be embedded in such a way that results in a lowest magnetic reluctance when internal actuation member 110 in at least one position (e.g., the position depicted in FIG. 4A or a position that is 180° from the position depicted in FIG. 4A) and a higher magnetic reluctance in another position (e.g., the position depicted in FIG. 4B).

Figure 5:
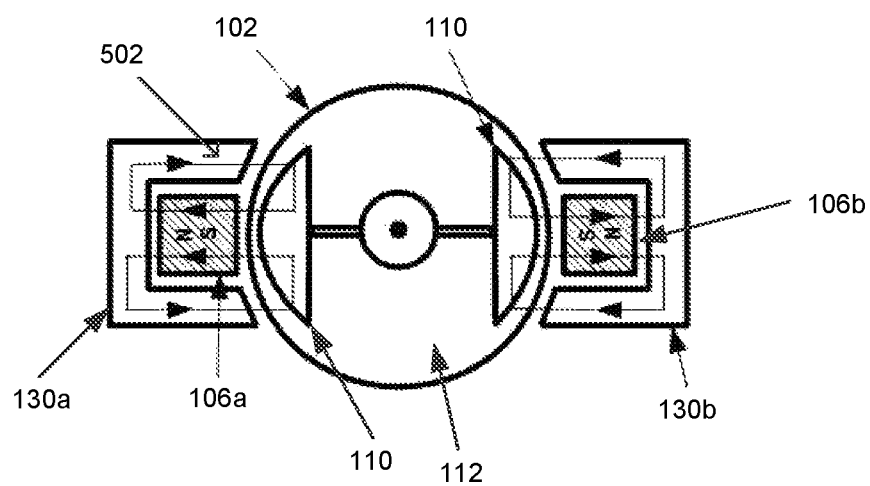
FIG. 5 depicts magnetic flux paths associated with another example magnet-actuated valve, in accordance with various aspects of the present disclosure.

FIG. 5 depicts magnetic flux paths 502 through body 102 of another example magnet-actuated valve, in accordance with various aspects of the present disclosure. In the example depicted in FIG. 5, two magnets 106a and 106b produce magnetic flux paths illustrated using flux lines 502. In the example depicted in FIG. 5, magnetic flux flows from the north pole section of magnet 106a through ferromagnetic external actuator 130a, through internal actuation member 110, and returns to the south pole section of magnet 106a. Similarly, magnetic flux flows from the north pole section of magnet 106b through ferromagnetic external actuator 130b, through internal actuation member 110, and returns to the south pole section of magnet 106a.

Figure 6:
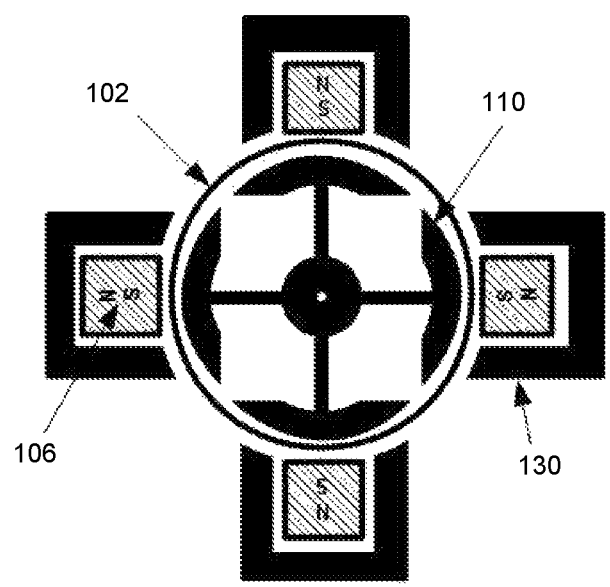
FIG. 6 depicts a magnet-actuated valve including four external magnets, in accordance with various aspects of the present disclosure.

In various examples, actuators 130a and 130b may be a part of the same valve handle. In some examples, a valve handle or actuator may only use a single magnet, such as magnet 106a, and a single actuator (such as ferromagnetic external actuator 130a) to actuate the valve. In various other examples, more than two magnets may be used in a similar configuration to that depicted in FIG. 5. For example, in the example depicted in FIG. 6, four external magnets are used. Using additional magnets may produce additional torque when rotating the external magnets 106 and/or the external actuator 130.

In various examples, the shape of internal actuation member 110 may be altered to produce increased torque. For example, the shape of internal actuation member 110 may be designed to maximize the magnetic flux density of the magnetic flux path through internal actuation member 110. For example, in FIG. 5, instead of the rod-shaped internal actuation member 110 depicted in FIGS. 1-4, the internal actuation member 110 depicted in FIG. 5 comprises a rounded surface facing away from the center of body 102 and toward external magnets 106a, 106b. Additionally, in the example depicted in FIG. 5, the surface of internal actuation member 110 opposite of the rounded surface is flat. Other shapes and designs of internal actuation member 110 may be used in order to reach a desired magnetic flux density for a particular valve type.

Figure 7:
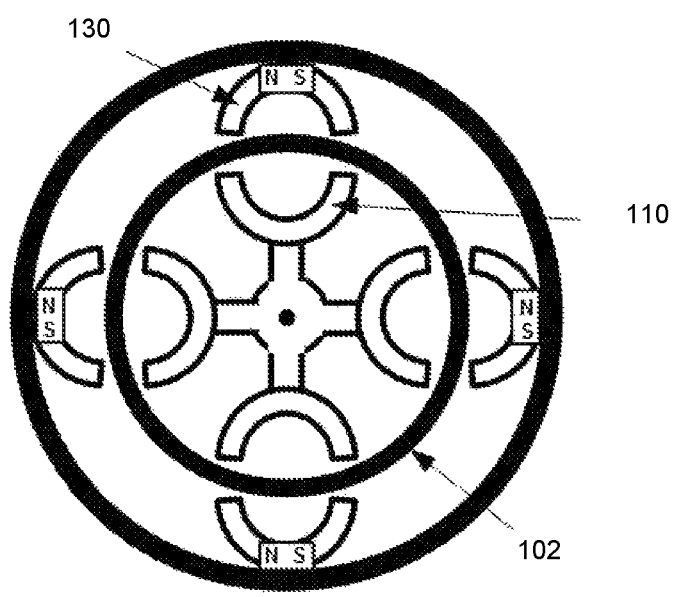
FIG. 7 depicts another magnet-actuated valve including four U-shaped external magnets, in accordance with various aspects of the present disclosure.

FIG. 7 depicts another magnet-actuated valve including four U-shaped external magnets, in accordance with various aspects of the present disclosure. Similar to the example depicted in FIG. 6, the embodiment shown in FIG. 7 includes four external, U-shaped magnets. Each of the four external U-shaped magnets creates its own magnetic flux path through body 102 and through internal actuation member 110.

Figure 8:
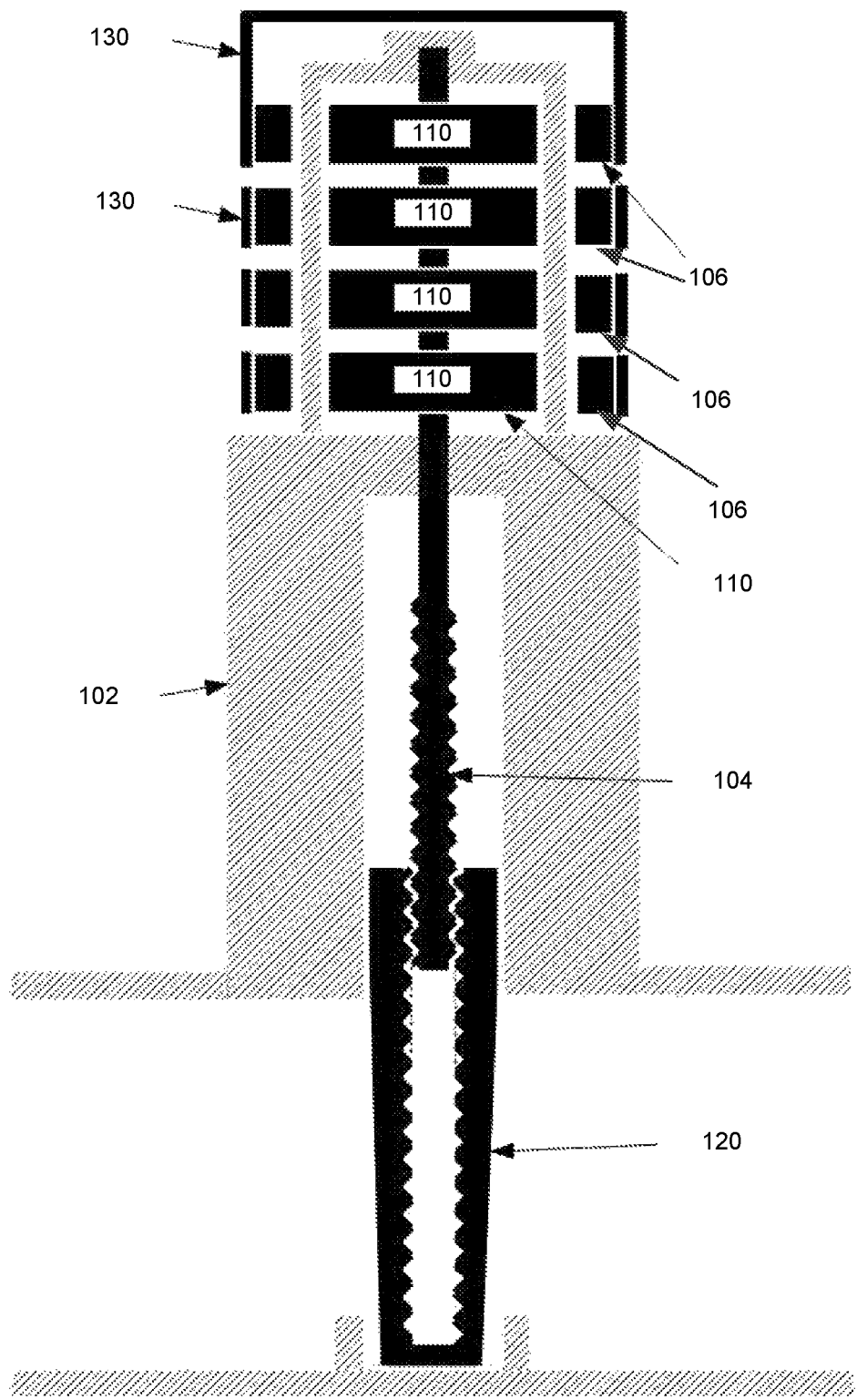
FIG. 8 depicts a cross-sectional side view of a magnet-actuated valve including four ferromagnetic actuation members and four sets of external magnets in accordance with various aspects of the present disclosure.

FIG. 8 depicts a cross-sectional side view of a magnet-actuated valve including four ferromagnetic actuation members and four sets of external magnets in accordance with various aspects of the present disclosure. Those portions of FIG. 8 that have been previously described with reference to FIGS. 1-7 may not be described again herein for purposes of clarity and brevity. The example depicted in FIG. 8 displays external magnets 106 stacked in a vertical orientation with respect to one another. In some examples, each vertical layer of external magnets 106 may correspond with its own internal actuation member 110. In some other examples, there may be a single internal actuation member 110 that is actuated by rotating external magnets 106 and actuators 130. As described previously, using additional external magnets 106 may produce additional torque when rotating the external magnets 106 along with actuator(s) 130.

FIG. 9 depicts a cross-sectional side view of a magnet-actuated ball valve, in accordance with some aspects of the present disclosure. Those components in FIG. 9 that have been described previously with reference to FIGS. 1-8 may not be described again for purposes of clarity and brevity. In the magnet-actuated ball valve depicted in FIG. 9, the valve member 120 may be a perforated ball 920. Rotation of external actuator 130 (and thus external magnets 106) may cause rotation of internal actuation member 110. Rotation of internal actuation member 110 may actuate movement of perforated ball 920. When the opening in perforated ball 920 is in line with the flow of material or in line with the direction of intended flow through the valve, the valve may be in an open position. When the opening in perforated ball 920 is not in line with the flow of material through or direction of intended flow, the valve may be in a closed position.

Figure 10:
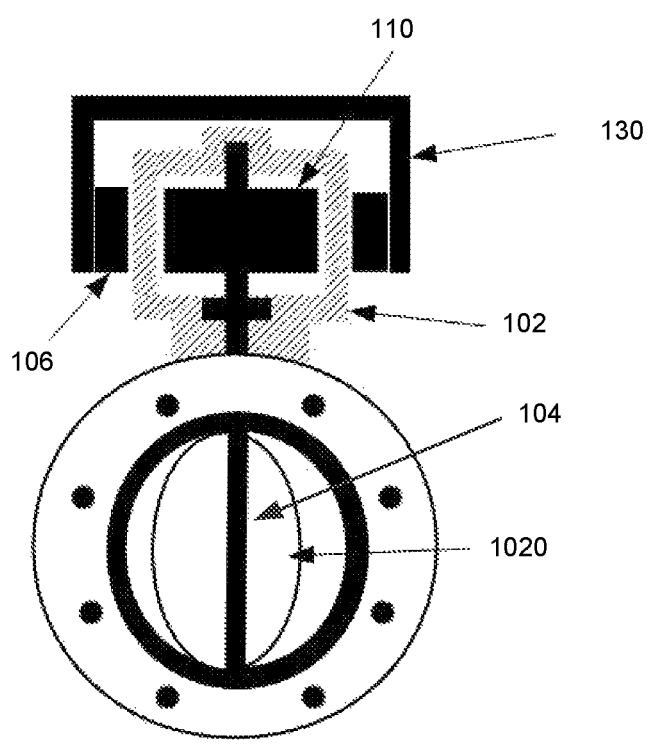
FIG. 10 depicts a cross-sectional side view of a magnet-actuated butterfly valve, in accordance with various aspects of the present disclosure.

FIG. 10 depicts a cross-sectional side view of a magnet-actuated butterfly valve, in accordance with various aspects of the present disclosure. Those components in FIG. 10 that have been described previously with reference to FIGS. 1-9 may not be described again for purposes of clarity and brevity. In the magnet-actuated butterfly valve depicted in FIG. 10, the valve member 120 may be a plate 1020 configured to rotate between an open and a shut configuration with the rotation of stem 104. Stem 104 may, in turn, be coupled to and rotate with internal actuation member 110. As previously discussed, internal actuation member 110 may rotate due to torque caused by rotation of external magnets 106.

Figure 11:
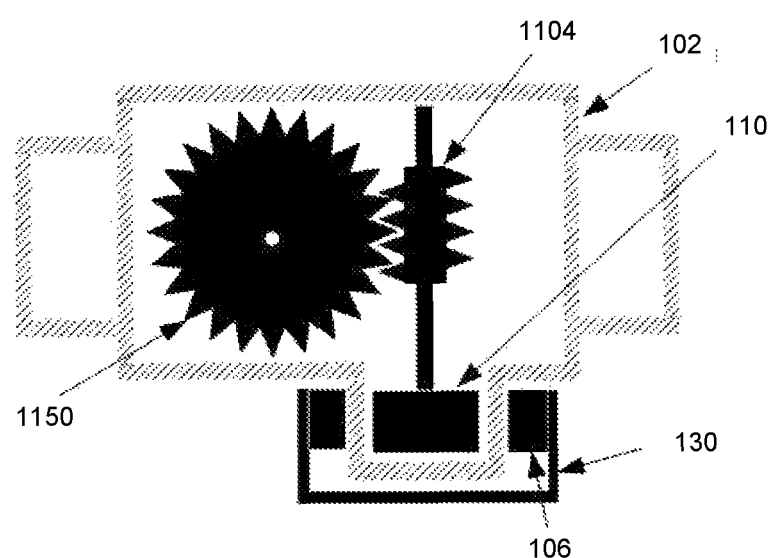
FIG. 11 depicts a cross-sectional side view of a worm gear coupled to an actuation mechanism of a magnet-actuated valve, in accordance with various aspects of the present disclosure.

FIG. 11 depicts a cross-sectional side view of a worm gear 1150 coupled to an actuation mechanism of a magnet-actuated valve, in accordance with various aspects of the present disclosure. Those components of FIG. 11 that have been previously discussed in reference to FIGS. 1-10 may not be discussed again herein for purposes of clarity and brevity. Various valve types, such as ball valves (FIG. 9) and/or butterfly valves (FIG. 10), may require higher torque to actuate relative to other types of valves, such as gate valves. Accordingly, in some examples in accordance with various embodiments described herein, the actuation mechanism of a valve may include a stem 1104 with a helical ridge (sometimes referred to as a "worm") effective to turn a worm gear 1150. The worm gear 1150 may produce an increased torque when rotated relative to rotation of stem 1104 alone. Turning worm gear 1150 may actuate the valve member between an open and a closed position.

Figure 12:
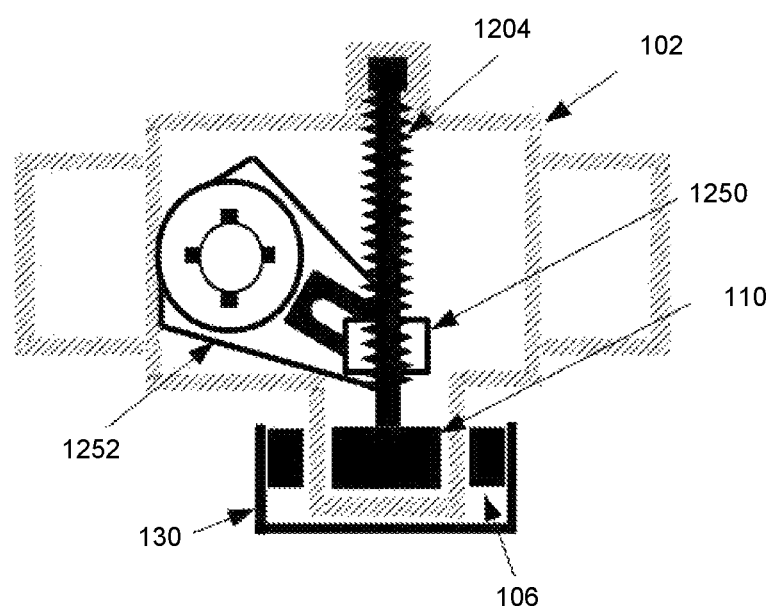
FIG. 12 depicts a cross-sectional side view of a travelling nut actuation mechanism coupled to the stem of a magnet-actuated valve, in accordance with various aspects of the present disclosure.

FIG. 12 depicts a cross-sectional side view of a travelling nut actuation mechanism coupled to the stem of a magnet-actuated valve, in accordance with various aspects of the present disclosure. Those components of FIG. 12 previously described with reference to FIGS. 1-11 may not be described herein for purposes of brevity and clarity. In various valve types that require more torque to operate, a traveling nut architecture may be used to increase the torque provided by the magnetic actuation mechanism described herein. Accordingly, in some examples in accordance with various embodiments described herein, the actuation mechanism of a valve may include a stem 1204 with a helical ridge mated to a traveling nut 1250. As internal actuation member 110 rotates, traveling nut 1250 may move up (or down, depending on the direction of rotation) stem 1204. Upwards and downwards movement of traveling nut 1250 may, in turn, rotate a lever 1252. The lever 1252 may produce an increased torque when rotated relative to rotation of stem 1204 alone. Turning lever 1252 may actuate the valve member between an open and a closed position.

FIGS. 13A and 13B depict a cross-sectional view of a lever-operated gate valve of a magnet-actuated valve, in accordance with various aspects of the present disclosure. Those components of FIG. 13 previously described with reference to FIGS. 1-12 may not be described herein for purposes of brevity and clarity. FIG. 13A shows the lever-operated gate valve in a closed position with valve member 120 blocking the flow of fluid through the valve (e.g., into and out of the page in the example shown). External magnet 106 may be above the exterior of the cross-sectional portion of the lever-operated gate valve depicted in FIGS. 13A and 13B. External actuator 130 may be rotated around a fulcrum. Rotation of external actuator 130 around the fulcrum may apply a magnetic force on internal actuation member 110. Internal actuation member 110 may be coupled to valve member 120.

As shown in FIG. 13B, when external actuator 130 is rotated around the fulcrum, internal actuation member 110 may move inside body 102 of the lever-operated gate valve. In turn, internal actuation member 110 may move valve member 120 between an open position and a closed position. In some examples, external actuator 130 may be a handle with a magnetic pole section situated both "above" the lever-actuated gate valve (e.g., out of the page), and another magnetic pole section situated "below" the lever-actuated gate valve (e.g., into the page). In such examples, the external actuator 130 may comprise a ferromagnetic material such that a magnetic flux path exists from the magnetic pole section above the valve, through the ferromagnetic portions of the internal actuation member 110, to the magnetic pole section below the valve, and through the ferromagnetic portions of the external actuator 130.

FIGS. 14A and 14B depict a magnetic flux path through a magnet-actuated valve including an external electromagnet 1420, in accordance with various aspects of the present disclosure. Although in many of the previous examples, permanent external magnets are shown and described, external electromagnets may be used in various embodiments. For example, FIGS. 14A and 14B depict a coil of wire wrapped around ferromagnetic external actuator 130. Supplying an electric current to the coil of wire produces magnetic flux and forms the magnetic flux path shown in FIG. 14A using flux lines 1470. Although a single electromagnet 1420 is shown, any number of electromagnets may be used in varying orientations in accordance with various examples. In general, when electromagnet 1420 is powered off, the valve will maintain its current position.

Figure 15:
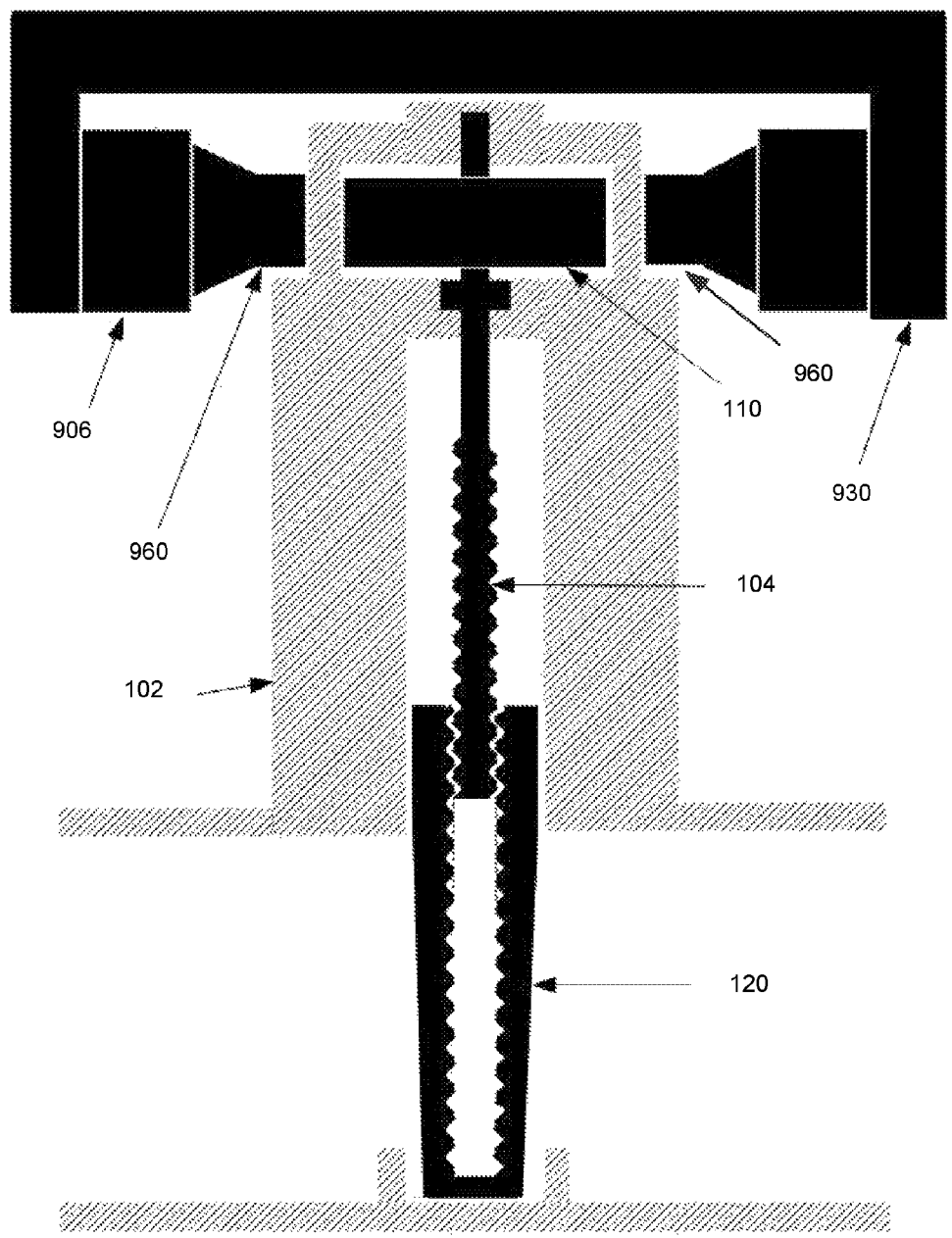
FIG. 15 depicts a cross-sectional side view of a magnet-actuated valve including a cheater handle, in accordance with various aspects of the present disclosure.

FIG. 15 depicts a cross-sectional side view of a magnet-actuated valve including a cheater handle, in accordance with various aspects of the present disclosure. In some circumstances, it may be desirable to over-torque a valve actuator. For example, in various industries, such as the petrochemical industry, valves may often become corroded and/or stuck in a particular position, such that a normal amount of torque may be insufficient to actuate the valve. In some cases, "cheater" handles may be used to over-torque the actuation mechanism of stuck valves.

The cheater handle may comprise an actuator 930 for a magnet-actuated valve that may be used with various embodiments described herein. The actuator 930 of the cheater handle may be coupled to larger and/or more powerful external magnets 906 relative to external magnets 106 (in terms of pull force and/or magnetic field strength) described in reference to FIG. 1. External actuator 930 may be a handle, and may further comprise a magnetically permeable material, such as a ferromagnetic material. Magnetically permeable conical portions 960 funnel the magnetic flux from external magnets 906 through internal actuation member 110. The surface of magnetically permeable conical portions 960 that are adjacent to external magnets 906 may correspond in size to the size of the external magnets 906. Similarly, the size of the surface of magnetically permeable conical portions 960 that are adjacent to internal actuation member 110 may correspond in size to the adjacent surface of internal actuation member 110. Magnetically permeable cones 960 may be disposed between the external magnets 906 and the portions of the body 102 adjacent to internal actuation member 110. The amount of torque applied to internal actuation member 110 when rotating cheater handle 930 and external magnets 906 may be larger relative to the amount of torque applied to internal actuation member 110 when rotating external actuator 130 and external magnets 106a, 106b, depicted in FIG. 1.

Accordingly, in some cases cheater handle 930 may be used to "break" stuck valves so that the valves may be actuated between a closed and open position (or vice versa).

Among other potential benefits, valves in accordance with embodiments of the present disclosure create a magnetic flux circuit through a magnetically asymmetric core of a sealed valve. A ferromagnetic actuation member sealed inside the valve forms a magnetically conductive path in certain orientations. The ferromagnetic actuation member can be oblong in shape or have different permeability in different directions by, for example, being comprised of different materials of different magnetic permeability. Torque may be transmitted from external magnets to the ferromagnetic actuation member. Actuation of the internal member may in turn drive the stem of the valve and may actuate the valve member between an open and a closed position or between a closed and an open position, depending on the direction in which the valve is actuated. The ferromagnetic actuation member has preferred orientations with respect to the external magnets. If the ferromagnetic actuation member is oriented in a position other than the preferred orientation while in the magnetic fields created by the external magnets, the ferromagnetic actuation member will experience a restorative torque, pulling the ferromagnetic actuation member back into the preferred orientation.

The use of external magnets, which may be part of a valve handle or otherwise coupled to an external actuator of a valve, allows the external magnets to be insulated and/or cooled if the valve is to be operated in temperatures exceeding the rated operating temperatures of the external magnets. Additionally, the external magnets may be removed when the valve is constructed and/or serviced in temperatures exceeding the Curie temperatures of the external magnets. Many common commercial magnets, such as Neodymium magnets have relatively low recommended operating temperatures and Curie temperatures. Valves designed in accordance with embodiments of the present disclosure may use such magnets since the magnets may be insulated, cooled, and/or removed prior to the valve reaching temperatures in excess of the Neodymium magnet's recommended operating and/or Curie temperatures. Additionally, valves in accordance with embodiments of the present disclosure may not require a stem seal where the stem extrudes from the body of the valve. Accordingly, stem seal leaks, which are a significant issue with many traditional valves, may be avoided. Generally, while the embodiments depicted in the figures show examples using a certain number of external magnets, different numbers of magnets, apart from what is shown, may be used in accordance with the techniques and valve architectures described herein. For example, while the example magnets in FIGS. 4A and 4B depict two external magnets 406a and 406b, a single external magnet may be used instead. Similarly, three or more external magnets may be used in accordance with the present disclosure. The type and/or number of external magnets used in various valve configurations may be chosen based on a desired amount of torque, based on design and manufacturing costs, and/or based on other concerns specific to a particular application. Therefore, the number of magnets shown in the various figures is not meant to be taken in a limiting sense and other, different numbers of external magnets are explicitly contemplated herein.

While the invention has been described in terms of particular embodiments and illustrative figures, those of ordinary skill in the art will recognize that the invention is not limited to the embodiments or figures described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A valve assembly, comprising:
    a valve body defining an enclosure;
    a movable valve member disposed in the enclosure;
    an internal actuation member having a ferromagnetic portion comprising an impermanent magnet, the internal actuation member operatively coupled to the movable valve member;
    an external actuator attached to an exterior of the valve body, the external actuator comprising:
        a first magnetic pole section adjacent to the valve body;
        a second magnetic pole section adjacent to the valve body, wherein when the external actuator is in a first rotational position relative to the internal actuation member there is at least a first magnetic reluctance between the first magnetic pole section, the second magnetic pole section, and the internal actuation member, and when the external actuator is in a second rotational position relative to the internal actuation member there is at least a second magnetic reluctance between the first magnetic pole section, the second magnetic pole section, and the internal actuation member, wherein the second magnetic reluctance is lower than the first magnetic reluctance such that when the external actuator is in the second rotational position, magnetic flux paths from the first magnetic pole section, through the ferromagnetic portion, to the second magnetic pole section have a magnetic field strength sufficient to cause rotation of the internal actuation member when the external actuator is rotated; and an impermanently magnetic ferromagnetic material completing a return flow path for magnetic flux between the first magnetic pole section and the second magnetic pole section.

2. The valve assembly of claim 1, wherein the internal actuation member comprises an elongate member having a first end aligned with the first magnetic pole section and a second end aligned with the second magnetic pole section.

3. The valve assembly of claim 1, wherein magnetic flux of the magnetic flux paths is effective to orient the internal actuation member in the second rotational position.

4. The valve assembly of claim 1, wherein at least a portion of the valve body comprises a cylindrical portion containing the internal actuation member;

the external actuator further comprises an annular base portion concentric with the cylindrical portion of the valve body;

the first magnetic pole section is disposed at a first location of the annular base portion; and the second magnetic pole section is disposed at a second location of the annular base portion.

5. The valve assembly of claim 1, wherein the first magnetic pole section and the second magnetic pole section comprise a magnet with the first magnetic pole section being a north pole of the magnet and the second magnetic pole section being a south pole of the magnet.

6. The valve assembly of claim 1, wherein the internal actuation member is disposed in a cavity of the valve body, wherein the cavity is sealed such that the external actuator is not mechanically coupled to the internal actuation member or a stem of the valve assembly.

7. The valve assembly of claim 1, further comprising a first port and a second port separated by the movable valve member.

8. The valve assembly of claim 1, further comprising a cheater handle, the cheater handle comprising:

at least one other magnet, wherein the at least one other magnet has a second magnetic field strength that is greater than the magnetic field strength of the first magnetic pole section and the second magnetic pole section, wherein the cheater handle is sized and shaped so as to couple to the exterior of the valve body.

9. The valve assembly of claim 1, further comprising:

a magnetically permeable conical portion, the magnetically permeable conical portion further comprising:

a first base in a first plane, and a second base in a second plane parallel to the first plane, wherein the second base has a larger area in the second plane relative to an area of the first base in the first plane; and wherein the second base is coupled to the first magnetic pole section.

10. The valve assembly of claim 1, wherein the external actuator is removable from the valve body such that the valve body may be heated without heating the external actuator, the first magnetic pole section, and the second magnetic pole section.

11. A valve comprising:

a valve body having an interior portion and an exterior portion, the interior portion defining a cavity;

a movable valve member movable between an open position and a closed position;

an internal actuation member having a ferromagnetic portion comprising an impermanent magnet disposed in the cavity, the internal actuation member operatively coupled to the movable valve member such that rotation of the internal actuation member actuates movement of the movable valve member between the open position and the closed position; and an external actuator attached to the exterior portion of the valve body, the external actuator comprising:

a first magnetic pole section adjacent to the exterior portion of the valve body;

a second magnetic pole section adjacent to the exterior portion of the valve body, wherein magnetic flux flows from the first magnetic pole section through the ferromagnetic portion to the second magnetic pole section in a magnetic flux path through the interior portion of the valve, the magnetic flux having a magnitude sufficient to cause movement of the internal actuation member in response to rotation of the external actuator, wherein the external actuator and the internal actuation member are configured to remain adjacent to one another during rotation of the external actuator; and an impermanently magnetic ferromagnetic material completing a return flow path for the magnetic flux between the first magnetic pole section and the second magnetic pole section.

12. The valve of claim 11, wherein the internal actuation member comprises an elongate member having a first end aligned with the first magnetic pole section and a second end aligned with the second magnetic pole section.

13. The valve of claim 11, wherein the magnetic flux is effective to orient the internal actuation member in a first orientation with respect to the first magnetic pole section and the second magnetic pole section.

14. The valve of claim 11, wherein an aligned orientation of the internal actuation member with respect to the external actuator results in a lower magnetic reluctance than other orientations of the internal actuation member with respect to the external actuator.

15. The valve of claim 11, wherein the valve body comprises a cylindrical portion containing the internal actuation member;

the external actuator comprises an annular base portion concentric with the cylindrical portion of the valve body;

the first magnetic pole section is disposed at a first location of the annular base portion; and the second magnetic pole section is disposed at a second location of the annular base portion.

16. The valve of claim 11, wherein the cavity is sealed such that the external actuator is not mechanically coupled to the internal actuation member or a stem coupled to the movable valve member.

17. The valve of claim 11, further comprising a magnetically permeable material disposed between the first magnetic pole section and a portion of the valve body adjacent to the internal actuation member, wherein a first size of a first surface of the magnetically permeable material that is adjacent to the first magnetic pole section corresponds to a second size of the magnetically permeable material, and a third size of a second surface of the magnetically permeable material corresponds to a fourth size of the portion of the valve body adjacent to the internal actuation member.

18. A method for magnetically actuating a valve, the method comprising:
- providing a valve comprising a sealed valve body, an internal actuation member disposed within the sealed valve body, and a valve member operatively coupled to the internal actuation member;
- attaching an external actuator to an exterior region of the sealed valve body, wherein the external actuator comprises:
  - a first magnetic pole section adjacent to the sealed valve body;
  - a second magnetic pole section adjacent to the sealed valve body; and
  - an impermanently magnetic ferromagnetic material;
- magnetizing at least a portion of the internal actuation member by exposing the internal actuation member to magnetic fields of the first magnetic pole section and the second magnetic pole section to create a magnetic flux flowing from the first magnetic pole section, through the internal actuation member, to the second magnetic pole section, and returning through the impermanently magnetic ferromagnetic material to the first magnetic pole section;
- rotating the external actuator, wherein the rotation of the external actuator causes a corresponding rotation of the internal actuation member due to the magnetic flux; and
- moving the valve member between an open position and a closed position, wherein the external actuator and the internal actuation member are configured to remain adjacent to one another during the rotation of the external actuator.

19. The method of claim 18, further comprising:
- removing the external actuator from the exterior region of the sealed valve body;
- heating the sealed valve body;
- determining that the sealed valve body has reached a temperature that is within a rated operating temperature range of the first magnetic pole section and the second magnetic pole section; and
- coupling the external actuator to the exterior region of the sealed valve body.

20. The method of claim 18, further comprising changing an orientation of a magnetic flux path through the sealed valve body in response to the rotating the external actuator.

21. The method of claim 18, wherein, when the external actuator is in a first rotational position relative to the internal actuation member there is a first magnetic reluctance between the first magnetic pole section and the second magnetic pole section, and when the external actuator is in a second rotational position relative to the internal actuation member there is a second magnetic reluctance between the first magnetic pole section and the second magnetic pole section, wherein the second magnetic reluctance is lower than the first magnetic reluctance.

22. The valve assembly of claim 1, wherein the external actuator and the internal actuation member are configured to remain adjacent to one another during the rotation of the internal actuation member and the external actuator.

* * * * *